May 18, 1965  L. L. HELLGREN  3,184,726
RECOVERABLE MONITORING CIRCUIT WITH PERMANENT INDICATION
Filed July 24, 1962

INVENTOR.
LEROY L. HELLGREN
BY Ervin F. Johnston
George J. Rubens
ATTORNEYS

United States Patent Office 3,184,726
Patented May 18, 1965

3,184,726
RECOVERABLE MONITORING CIRCUIT WITH PERMANENT INDICATION
Leroy L. Hellgren, San Jose, Calif., assignor to the United States of America as represented by the Secretary of the Navy
Filed July 24, 1962, Ser. No. 212,176
6 Claims. (Cl. 340—223)

The present invention relates to a recoverable circuit analyzer and more particularly to a device for determining the sequence of events within an electrical circuit.

There has long existed a problem in the art of obtaining data as to the sequence of events of ignition, separation, arming and so forth of a missile while it is in flight. The reliability of electronic equipment such as telemetering devices under shock conditions have been unpredictable and in many instances have left technical personnel without any information whatsoever as to what was the cause of missile failure. Accordingly, there has long been a need for a means which will analyze the sequence of events that are to take place within a missile during its flight and be available to technical personnel even though the missile undergoes extreme shock conditions such as an explosion in flight. The present invention provides a means for indicating to these personnel the sequence of events within the missile regardless of the shock conditions involved. This is accomplished by providing a series of pyrotechnic indicators within the missile's circuitry which are protected in such a way that they can be recovered after the termination of flight so as to give indication as to the sequence of events in question. The pyrotechnic indicators are connected in the missile circuitry in such a way that they do not effect the function of the circuitry. While the invention will be described for use primarily in missile circuitry it is to be understood that it can be used for many other uses such as indicating the angle of collision of an aircraft.

An object of the present invention is to provide a simple device which will indicate the sequence of events within an electrical circuit.

Another object to provide a device which will provide an indication as to the sequence of events within an electrical circuit when the circuit is subjected to extreme shock conditions.

A further object is to provide a device which will determine the sequence of events within missile circuitry even though the missile is destroyed in flight.

Yet another object of the present invention is to provide a device which will indicate a sequence of events within an electrical circuit without any substantial effect upon the function of said circuit.

A still further object of the invention is to provide a device which will indicate the sequence of events within an electrical circuit that is subjected to extreme shock conditions with the device having substantially no effect on the function of the circuit.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
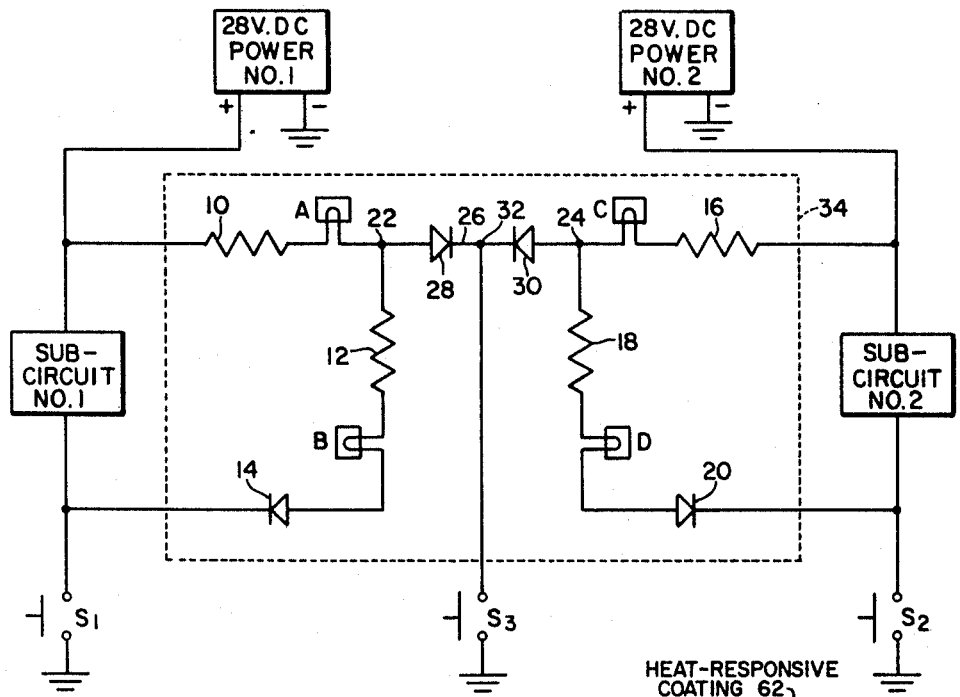
FIG. 1 shows a schematic view of one embodiment of the invention.

Referring now to the drawing wherein like reference numerals designate like or corresponding parts throughout the several views there is shown in FIG. 1 an electrical circuit having a pair of current paths, the first current path connecting a pair of pyrotechnic indicators A and B, resistors 10 and 12, a diode 14 and a pushbutton type switch $S_1$ in series across a D.C. power source No. 1 and a second current path connecting a pair of pyrotechnic indicators C and D, resistors 16 and 18, a diode 20 and a switch $S_2$ in series across a D.C. power source No. 2. The current paths are connected together at points 22 and 24 by a lead 26, the lead 26 also connecting a pair of diodes 28 and 30 in opposition to one another. A switch $S_3$ is connected between a point 32 to ground. A sub-circuit No. 1 is connected in parallel with the pyrotechnic indicators A and B, the resistors 10 and 12 and the diode 14 of the first path and a sub-circuit No. 2 is connected in parallel with the pyrotechnic indicators C and D, the resistors 16 and 18 and the diode 20 of the second current path. The diodes 14 and 20 are provided to isolate the sub-circuits Nos. 1 and 2 from the indicators B and D respectively when the indicators are actuated. Each sub-circuit is optional and will function when its respective switch $S_1$ or $S_2$ is closed. If the sub-circuits are not employed the diodes 14 and 20 can likewise be omitted. The diodes 28 and 30 are used to isolate the two power sources from one another. Enclosing all of the indicators, the resistors and the diodes is a crash box 34 which is constructed to withstand predetermined shock forces.

Figure 2:
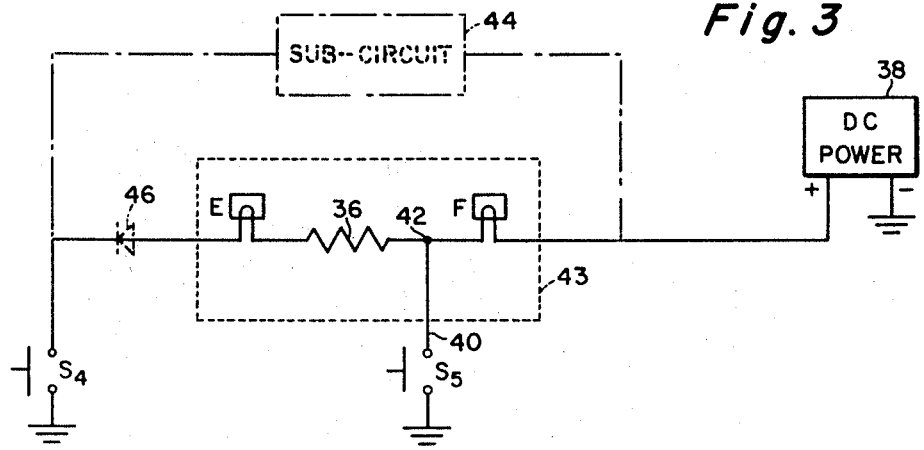
FIG. 2 illustrates a schematic view of another embodiment of the invention.

In FIG. 2 there is shown another embodiment of the invention wherein a current path connects a resistor 36, pyrotechnic indicators E and F, and a switch $S_4$ in series across a D.C. power source 38. A lead 40 connects a switch $S_5$ from a point 42 to ground. Enclosing the pyrotechnic indicators E and F and the resistor 36 is a crash box 43 which is constructed to withstand a predetermined shock force. A sub-circuit 44 powered by the D.C. power source 38 is optional and would be employed where an additional function is to be performed. When the sub-circuit 44 is employed a diode 46 is inserted so as to isolate the sub-circuit from the indicator E after it goes to ground upon operation.

The pyrotechnic indicators A through F are small capsules which are activated by heat from a wire bridge through which a current is passed. A thermal sensitive preparation (paint) is painted on one end of the indicator and when an electrical pulse of a specified current and duration is applied to the indicator, a pyrotechnic mixture within the indicator is activated to produce heat sufficient to change the color of the thermal sensitive preparation painted on the indicator. The indicator is constructed such that immediately after actuation it goes to ground. The burning rate of the pyrotechnic mixture within the indicators is very slow so that no explosion is evident. These pyrotechnic indicators, which are to be more fully described in connection with FIG. 3 of the drawings, are commercially available from the following companies: Borg Warner, Maxson Corporation, Atlas Powder Company or E. I. du Pont Company. It is to be understood that any indicator which grounds itself and produces at least a semi-permanent indication will be suitable so, accordingly, the invention is not limited to the use of pyrotechnic indicators. For instance, a flash bulb type of indicator that grounds itself would be suitable.

A circuit design that has been found suitable for the device shown in FIG. 1 is as follows: (1) each of the D.C. power sources having a potential of 28 volts, (2) pyrotechnic indicators which activate when a current of 185 milliamperes is applied for a period of approximately 840 microseconds, these indicators having on the average a resistance of about 2.5 ohms, (3) each of the resistors having a value of about 2 watts, and (4) diodes of the In483 A transitron silicon junction type. In any instance the value of the resistors 12 and 18 of the device shown in FIG. 1 are to be of such a value that when the switches $S_1$ and $S_3$ or the switches $S_2$ and $S_3$ close simultaneously the drop across these resistors are to be such that the indicators B and D will not be actuated. The same consideration applies to the device of FIG. 2 wherein the resistor 36 is to be of such a value that when the switches $S_4$ and $S_5$ close simultaneously the drop across the resistor 36 will be such as to prevent the actuation of indicator E. The design of the crash boxes 34 and 42 are preferably a steel box which has a structural strength so as to prevent damage to any of the indicators should they undergo a shock condition. The wires passing through these boxes 34 and 42 could of course traverse the box through a small hole drilled therethrough with potting compound sealing the area or the wire could go through a Heco type of bushing inserted in the box. As an alternative means of protecting the indicators each indicator could individually be housed within a small crash compartment type of box.

In the operation of either of the embodiments shown in FIGS. 1 and 2 an operator will be concerned with recovering the indicators to determine which indicators have been actuated by a visual inspection of the paint thereon, a discoloration of this paint indicating that this particular indicator has been actuated. Table 1 refers to the sequence of closing of the switches of the device shown in FIG. 1, this sequence being shown by the pyrotechnic indicators that are actuated.

*Table 1*

[For FIG. 1 only]

| Sequence of Switching | Indicators actuated | | | |
|---|---|---|---|---|
| | A | B | C | D |
| 1. Neither power supply No. 1 nor No. 2 operating | | | | |
| 2. $S_1$ closed simultaneously with or after $S_3$ and power supply No. 2 not operating | X | | | |
| 3. $S_2$ closed simultaneously with or after $S_3$ power supply No. 1 not operating | | | X | |
| 4. Both $S_1$ and $S_2$ closes simultaneously with or after $S_3$ | X | | X | |
| 5. $S_1$ closed before $S_3$ *and* power supply No. 2 not operating | X | X | | |
| 6. $S_2$ closed before $S_3$ *and* power supply No. 1 not operating | | | X | X |
| 7. $S_1$ closed before $S_3$ and $S_2$ closed simultaneously with or after $S_3$ | X | X | X | |
| 8. $S_2$ closed before $S_3$ and $S_1$ closed simultaneously with or after $S_3$ | X | | X | X |
| 9. $S_1$ and $S_2$ simultaneously closed before $S_3$ | X | X | X | X |

Legend:
Blank—did not indicate.
X—indicated.

Should $S_1$ close simultaneously with or after $S_3$ and the power supply No. 2 is not operating only the pyrotechnic indicator A will be actuated as shown in item 2 of Table 1. Assuming that $S_1$ closes simultaneously with $S_3$ there will be a current flow from switch $S_3$ through diode 28 to point 22 and there will be a simultaneous current flow from switch $S_1$ through the diode 14, the indicator B and the resistor 12 to the point 22. Because of the resistive value of the resistor 12 the current flow through the indicator B will not be sufficient to actuate this indicator and the current flow through the indicator A will cause its actuation. Should $S_1$ close after $S_3$ the same result would be obtained. After the indicator A has been actuated it goes to ground. Accordingly should switch $S_1$ close after switch $S_3$ the indicator B will not be actuated since there is no potential thereacross. Next should switch $S_1$ close prior to switch $S_3$ and the power supply No. 2 is not operating only the indicators A and B will be actuated as shown in item 5 of table 1. When switch $S_1$ closes before switch $S_3$ current flows from switch $S_1$ through both of the indicators A and B with a sufficient current so as to cause their actuation. With these several examples described it is plainly obvious how the various combinations of indications shown in Table 1 indicate the sequence of switching shown therein.

The device shown in FIG. 2 is a simpler arrangement wherein only two switches are involved. Upon the closing of switch $S_4$ simultaneously with or after switch $S_5$ only the indicator F will be actuated. Should $S_4$ be closed simultaneously with $S_5$ current will flow from both switches $S_4$ and $S_5$ to point 42 and the drop across the resistor 36 will be such as to prevent the actuation of indicator E. Accordingly the majority of the current flow is through indicator F causing it to be actuated and grounded. Should switch $S_4$ be closed after the closing of switch $S_5$ there would be no actuation of indicator E since there is no potential across indicator E due to the grounding of indicator F. Should $S_4$ close before $S_5$ current will flow from $S_4$ through both indicators E and F causing both of them to actuate.

Figure 3:
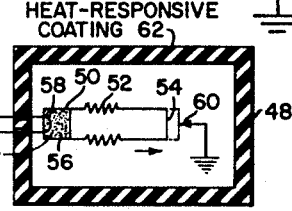
FIG. 3 is a detailed illustration, partly in section, of one of the components of FIGS. 1 and 2.

In FIG. 3 of the drawings is shown one form of pyrotechnic indicator suitable for use in the circuits of FIGS. 1 and 2. This indicator may comprise a chamber or housing 48 composed of some insulating material and containing therewithin a tubular member 50 which is closed at both ends as shown. A portion of this tubular member 50 is in the form of a bellows 52, so that the end portion 54 of the tubular member 52 is capable of moving in a horizontal direction as shown in the drawing. In the example illustrated, such movement will be to the right, whereupon the end portion 54 will occupy a position as shown by the broken lines. The left-hand portion of the tubular member 50 is fixed in position, and contains a pyrotechnic mixture 56 within which is embedded a bridgewire 58. This is the wire shown in FIGS. 1 and 2 as being contained within the indicating units A through F. When current flows through the bridgewire 58, the pyrotechnic mixture 56 is ignited, and creates a pressure within the closed tube 50. This expands the bellows 52 and brings the end portion 54 into engagement with a grounded contact 60. At the same time, the temperature rise within the housing 48 resulting from ignition of the pyrotechnic mixture causes the heat-responsive coating 62 to change its color and thus provide an indication to an observer that the indicator has been actuated.

All of these switches are shown to be of the push button type, however, any circuit closing means would be suitable depending upon the application. Many various arrangements can be employed for closing the switches such as a coil or a longitudinal solenoid or each switch can take the form of a relay. There are many applications for either of the devices shown in FIG. 1 or FIG. 2. Assuming that the device shown in FIG. 1 is mounted in a missile and the switches are closed by some exterior circuitry the indicators by their actuation will indicate the sequence of the closing of the switches. Another application would be to employ either of the devices in an aircraft with the switches spaced along a leading edge of the aircraft so that upon a collision the angle of impact would be foretold. For instance, if the switch $S_2$ were located near the tip of the right wing, the switch $S_3$ were located at the nose of the aircraft and the switch $S_1$ were located near the tip of the left wing, should the aircraft become involved in a collision from its right side the indicators would indicate that the switch $S_2$ close before the switches $S_1$ and $S_3$.

It is to be noted that the power sources are represented as having a potential with respect to ground and one terminal on each of the switches goes to ground. This is of course a simple method of arranging the circuitry and is the same as applying a potential across each of the switches.

It is now readily apparent that the present invention provides a simple and foolproof way of indicating the sequence of events within an electrical circuit of circuits by providing pyrotechnic indicators at preselected positions therein. By enclosing these indicators within a crash compartment they can be recovered to indicate data concerning circuits which heretofore have never been available when extreme shock conditions have occurred. By arranging these pyrotechnic indicators as described there is substantially no effect on the function of the remainder of the circuitry.

Obviously many modifications and variations of the present invention are possible in the light of the above teachings. It is therefore to be understood that within the scope of the appended claims the invention may be practiced otherwise and as specifically described.

I claim:

1. In a circuit having at least a pair of switches and a D.C. power source, an analyzer comprising:
   (a) a pair of self-grounding indicators, each of which produces a permanent indication when it operates to ground itself upon the application thereto of the potential of the said D.C. power source;
   (b) a first one of the indicators and a first one of the switches connected in series with one another across the D.C. power source;
   (c) a second one of the indicators, a resistor and a second one of the switches connected in series with one another across said first switch;
   (d) said resistor having a resistive value such as to prevent operation of the second indicator when both switches are closed simultaneously, whereby operation of the first indicator only will indicate that the first switch closed before or simultaneously with the second switch and operation of both indicators will indicate that the second switch closed before the first switch.

2. In combination with a circuit having at least a pair of switches; an analyzer for determining the sequence of closing of the switches comprising:
   (a) a D.C. power source;
   (b) a pair of self-grounding indicators, each of which produces a permanent indication when it operates to ground itself upon the application thereto of the potential of the said D.C. power source;
   (c) a first one of the indicators and a first one of the switches connected in series with one another across the D.C. power source;
   (d) a second one of the indicators, a resistor and a second one of the switches connected in series with one another across said first switch;
   (e) said resistor having a resistive value such as to prevent operation of the second indicator when both switches are closed simultaneously, whereby operation of the first indicator only will indicate that the first switch closed before or simultaneously with the second switch and operation of both indicators will indicate that the second switch closed before the first switch.

3. An analyzer as claimed in claim 2 including:
   (a) means enclosing the indicators so that they will withstand calculated crash forces, whereby upon the circuit being involved in said crash the indicators can be recovered to indicate the sequence of operation of said switches.

4. An analyzer as claimed in claim 2 including:
   (a) a sub-circuit connected across the pair of indicators so that the second indicator, the second switch and the sub-circuit are tied to a common junction;
   (b) and a diode connected between the junction and the second indicator so as to prevent the second indicator from supplying a current to said sub-circuit after operation of the second indicator.

5. In combination with a circuit having a pair of D.C. power sources and at least a pair of switches; an analyzer for determining the sequence of closing of the switches comprising:
   (a) a plurality of pyrotechnic indicators, each of which operates to ground itself upon the application thereto of a potential from at least one of said D.C. power sources and which produces a permanent color indication upon such operation;
   (b) first and second current paths, each of which is connected, across a respective one of the said D.C. power source;
   (c) each path connecting a first and a second one of the indicators, a resistor and one of the switches in series with one another with the resistor connected between the indicators and the switch connected between the second indicator and the power source;
   (d) the D.C. power source applying each current path being capable of operating said first and second indicators therein;
   (e) means connecting the paths together at points between the first indicator and the resistor in each path;
   (f) said means also connecting a pair of diodes in series with one another with the diodes bucking one another;
   (g) means connecting a third switch from a point between said diodes to each of said power sources;
   (h) and the resistor in each path having a resistive valve such as to prevent operation of the second indicator when the switch within the current path and said third switch are closed simultaneously, whereby operation of said indicators will indicate the sequence of closing of said switches.

6. An analyzer as claimed in claim 5 including:
   (a) each path having a sub-circuit connected in parallel with the indicators and the resistor therein;
   (b) and a diode connected in each current path between the second indicator and said sub-circuit.

References Cited by the Examiner

UNITED STATES PATENTS

| 2,027,864 | 1/36 | Hand | 340—223 |
| 2,206,827 | 7/40 | Prince | 340—223 |

NEIL C. READ, *Primary Examiner.*

UNITED STATES PATENT OFFICE
CERTIFICATE OF CORRECTION

Patent No. 3,184,726　　　　　　　　　　　　　　　　May 18, 1965

Leroy L. Hellgren

It is hereby certified that error appears in the above numbered patent requiring correction and that the said Letters Patent should read as corrected below.

Column 6, line 22, after "connected" strike out the comma; line 23, for "source" read -- sources --; line 29, for "applying" read -- supplying --.

Signed and sealed this 12th day of October 1965.

(SEAL)
Attest:

ERNEST W. SWIDER
Attesting Officer

EDWARD J. BRENNER
Commissioner of Patents